United States Patent
Breuer et al.

(10) Patent No.: US 7,120,867 B2
(45) Date of Patent: Oct. 10, 2006

(54) SYSTEM AND METHOD FOR CONVERSION OF DIRECTLY-ASSIGNED FORMAT ATTRIBUTES TO STYLES IN A DOCUMENT

(75) Inventors: Matthias Breuer, Seevetal (DE); Christian Lippka, Hohenfelde (DE)

(73) Assignee: Sun Microsystems, Inc., Santa Clara, CA (US)

( * ) Notice: Subject to any disclaimer, the term of this patent is extended or adjusted under 35 U.S.C. 154(b) by 593 days.

(21) Appl. No.: 09/785,865

(22) Filed: Feb. 15, 2001

(65) Prior Publication Data

US 2002/0010717 A1    Jan. 24, 2002

(30) Foreign Application Priority Data

Feb. 16, 2000    (EP) ................... 00103172
Aug. 1, 2000    (EP) ................... 00116614

(51) Int. Cl.
   *G06F 15/00*    (2006.01)
   *G06F 17/00*    (2006.01)

(52) U.S. Cl. ................... 715/517; 715/501.1; 715/523; 715/530

(58) Field of Classification Search .............. 715/517, 715/501.1, 523, 530
   See application file for complete search history.

(56) References Cited

U.S. PATENT DOCUMENTS 4,881,197 A * 11/1989 Fischer ...................... 715/530
5,669,005 A * 9/1997 Curbow et al. ............. 715/523
5,802,381 A * 9/1998 Matsumoto et al. ........ 715/517
5,956,737 A * 9/1999 King et al. .................. 715/517

FOREIGN PATENT DOCUMENTS

| EP | 0 337 068 A2 | 10/1989 |
| EP | 0 351 433 A1 | 1/1990 |
| EP | 0 433 073 A2 | 6/1991 |
| JP | 2 028868 A | 1/1990 |

OTHER PUBLICATIONS

Turbo C++ Version 4.5, Borland International, 1995, application and help screenshots pp. 1-15.*
Dolinar, Lou, Wing it! Unraveling mysteries of hypertext Markup, Tulsa world, Tulsa, Okla, Aug. 1, 1998, p. 8.*

* cited by examiner

*Primary Examiner*—William Bashore
(74) *Attorney, Agent, or Firm*—Gunnison, McKay & Hodgson, L.L.P.; Forrest Gunnison

(57) ABSTRACT

A method of formatting a computer-readable document including a plurality of objects having directly-assigned attributes includes detecting the objects having directly-assigned attributes, creating a conversion style element for every detected combination of directly-assigned attributes, and replacing the directly-assigned attributes by a reference to the corresponding conversion style element. A change of a particular attribute throughout the entire document can thus be carried out simply by changing the conversion style elements in which this attribute appears.

17 Claims, 4 Drawing Sheets

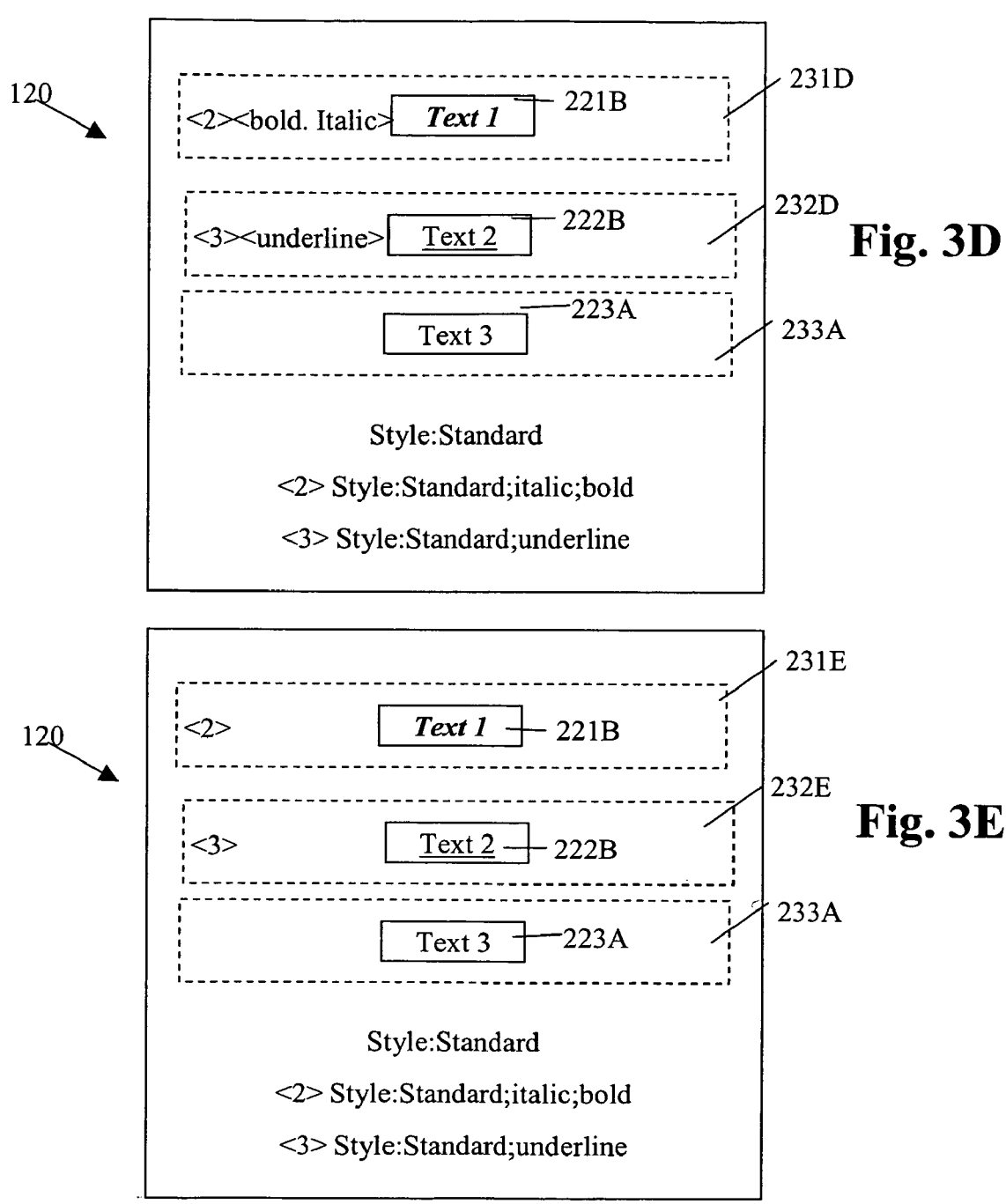

SYSTEM AND METHOD FOR CONVERSION OF DIRECTLY-ASSIGNED FORMAT ATTRIBUTES TO STYLES IN A DOCUMENT

BACKGROUND OF THE INVENTION

1. Field of the Invention

The present invention relates generally to processing computer-readable documents, and in particular to a method of formatting a computer-readable document that has a plurality of objects having directly-assigned attributes.

2. Description of Related Art

Computer-readable documents like text documents, graphics documents, presentations etc. contain a plurality of formatted objects like characters, formulae, paragraphs, etc. In general, there are two ways of creating such formatted objects.

In a first way, a style or template is used that describes one or more attributes, e.g., bold, font color, font size, underline etc., of objects in a portion of the computer-readable document to which the respective style or template is applied. The formatting style or template defines the formatting properties of the whole document portion, such as a text portion. Typically, a style or template is applied to an entire computer-readable document, or to one or more objects with a document.

The other way of creating a formatted object in a computer-readable document is direct formatting in which the user assigns the attributes of a selected document portion directly using function keys or other input devices like a mouse. The format is directly defined for the selected document portion like a character, a text paragraph, a table, mathematical formula etc. by the user choosing the desired attribute for the selected document portion. Frequently, direct formatting is used within or for an object that uses a style or template to provide formatting other than that provided by the style or template.

In many cases, it is necessary to change certain attributes or style properties of a document like a text document during editing of the document. For example, a particular attribute like a color is not available on a specific output device like a printer, or is found to be less appealing than expected. If the user has generated the text only using a style or template, such an amendment is made rather easily by changing the attributes of the respective style.

In many cases, however, the user prefers to frequently use direct formatting when producing the text document. This may be faster or more convenient for the user. If, however, directly-assigned attributes in a large text document have to be changed, these changes must all be carried out "manually", selecting every object having the directly-assigned attribute and changing the same. This process is awkward and time-consuming since the user wishing to change the directly-assigned attributes has to go through the complete document and change all appearances of these directly-assigned attributes.

In prior art consumer application software, styles or templates are stored, for example, in a separate subentry of the document. This subentry contains the name of the style, parent and child (or follow) styles and separate sections for defining paragraph attributes and character attributes. Other prior art applications save the styles in another block of the file.

Directly-assigned attributes are for example stored in a particular subentry in blocks of 512 bytes. In the document, text references to the subentry containing the directly-assigned attributes definitions and positional information about attribute changes are then included. Alternatively, all the information about directly-assigned attributes is included in a data block appended to a document portion like a text paragraph, in which the object with the directly-assigned format appears.

SUMMARY OF THE INVENTION

A method of formatting a computer-readable document comprising a plurality of objects having directly-assigned attributes in one embodiment of the present invention facilitates a later change of these directly-assigned attributes. In one embodiment, the method of formatting a computer-readable document comprising a plurality of objects having directly-assigned attributes includes detecting objects, in the computer-readable document, having directly-assigned attributes. The method creates a conversion style element for every detected combination of directly-assigned attributes in the computer-readable document. In another embodiment, a conversion style element is created only for each unique combination of directly-assigned attributes. Next, the method replaces the directly-assigned attributes of each detected object by a reference to one conversion style element where the one conversion style element corresponds to the directly-assigned attributes.

These operations are performed after opening the computer-readable document in a random access memory of a computer system prior, and after receiving a request from a user to perform the detecting, creating and replacing operations. In one embodiment, the computer-readable document is a text document.

The formatting method according to one embodiment of the present invention allows the user to change the directly-assigned attributes of objects as easy as object attributes defined by a style. In particular, the user only has to edit the conversion style element, and the format of each object having a reference to the conversion style element is changed according to the edit. Hence, editing such a document is greatly enhanced and facilitated. In one embodiment, the conversion style elements created are reconvertible into the corresponding directly-assigned attributes.

In one embodiment of the present invention, a computer system includes a processor and a memory storing a method for formatting a computer-readable document comprising a plurality of objects having directly-assigned attributes. Upon execution of the method on the processor, the method comprises:

detecting objects, in the computer-readable document, having directly-assigned attributes;

creating a conversion style element for every detected combination of directly-assigned attributes in the computer-readable document; and replacing directly-assigned attributes of each detected object by a reference to one conversion style element wherein the one conversion style element corresponds to the directly-assigned attributes.

In another embodiment of the present invention, a computer program product has stored thereon a method of formatting a computer-readable document comprising a plurality of objects having directly-assigned attributes. The stored method includes:

detecting objects, in the computer-readable document, having directly-assigned attributes;

creating a conversion style element for every detected combination of directly-assigned attributes in the computer-readable document; and replacing directly-assigned attributes of each detected object by a reference to one conversion style element wherein the one conversion style element corresponds to the directly-assigned attributes.

According to an embodiment of the present invention, all attributes of the respective document are defined by style elements so that a particular attribute can be changed in the entire document by only changing the style elements in which this particular attribute is contained. A manual review of the document in respect to the appearance of this particular style attribute is therefore no longer necessary. The editing of the document is therefore greatly facilitated.

BRIEF DESCRIPTION OF THE DRAWINGS

FIG. 3D is a schematic illustration of the document of FIG. 3C after a conversion style element has been associated with an object having the corresponding directly assigned attributes in the method for converting directly-assigned attributes to conversion style elements according to an embodiment of the present invention.

FIG. 3E is a schematic illustration of the document of FIG. 3A after the directly assigned attributes to objects in the document have been converted to conversion style elements in the method for converting directly-assigned attributes to conversion style elements according to an embodiment of the present invention.

Herein, elements with the same reference numeral are the same or a similar element.

DETAILED DESCRIPTION OF THE INVENTION

In one embodiment of the present invention, a method 130 executing on a central processing unit (CPU) 101 of a computer system 100 allows a user of computer system 100 to edit directly-assigned attributes of objects 121, 122, 123 in a computer-readable document 120 as easily as editing object attributes defined by a style. Hence, method 130 greatly enhances and facilitates editing computer-readable document 120 compared to the prior art method that required individually editing each object with a directly-assigned attribute.

Figure 1:
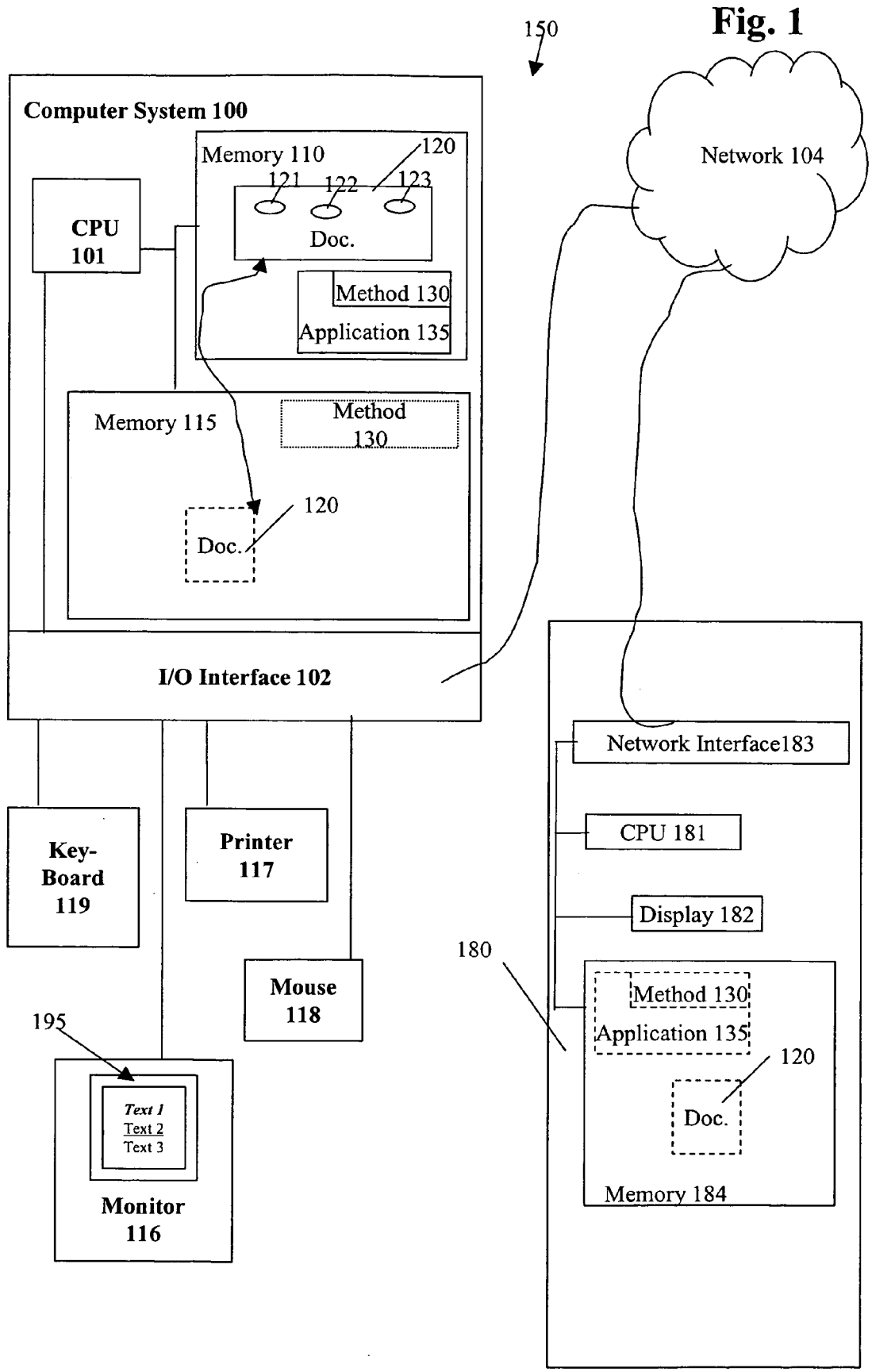
FIG. 1 is block diagram of a computer system that includes a method for converting directly-assigned attributes to conversion style elements according to an embodiment of the present invention.

In FIG. 1, document 120 with objects 121, 122 and 123 is presented on display screen 195 of monitor 116. As explained more completely below, method 130 detects objects in computer-readable document 120 with directly-assigned attributes. Method 130 creates a conversion style element for each combination of directly-assigned attributes and assigns a descriptive name to each conversion style element to facilitate identification of the conversion style element by the user.

Next, method 130 processes document 120 and replaces directly-assigned attributes for each object with a reference to the appropriate conversion style element, e.g., the conversion style element corresponding to the directly-assigned attributes of the object. Hence, to edit the directly-assigned attributes, the user has to only access the appropriate conversion style element and edit the conversion style element to change the attributes of every object that has a reference to that conversion style element.

Figure 2:
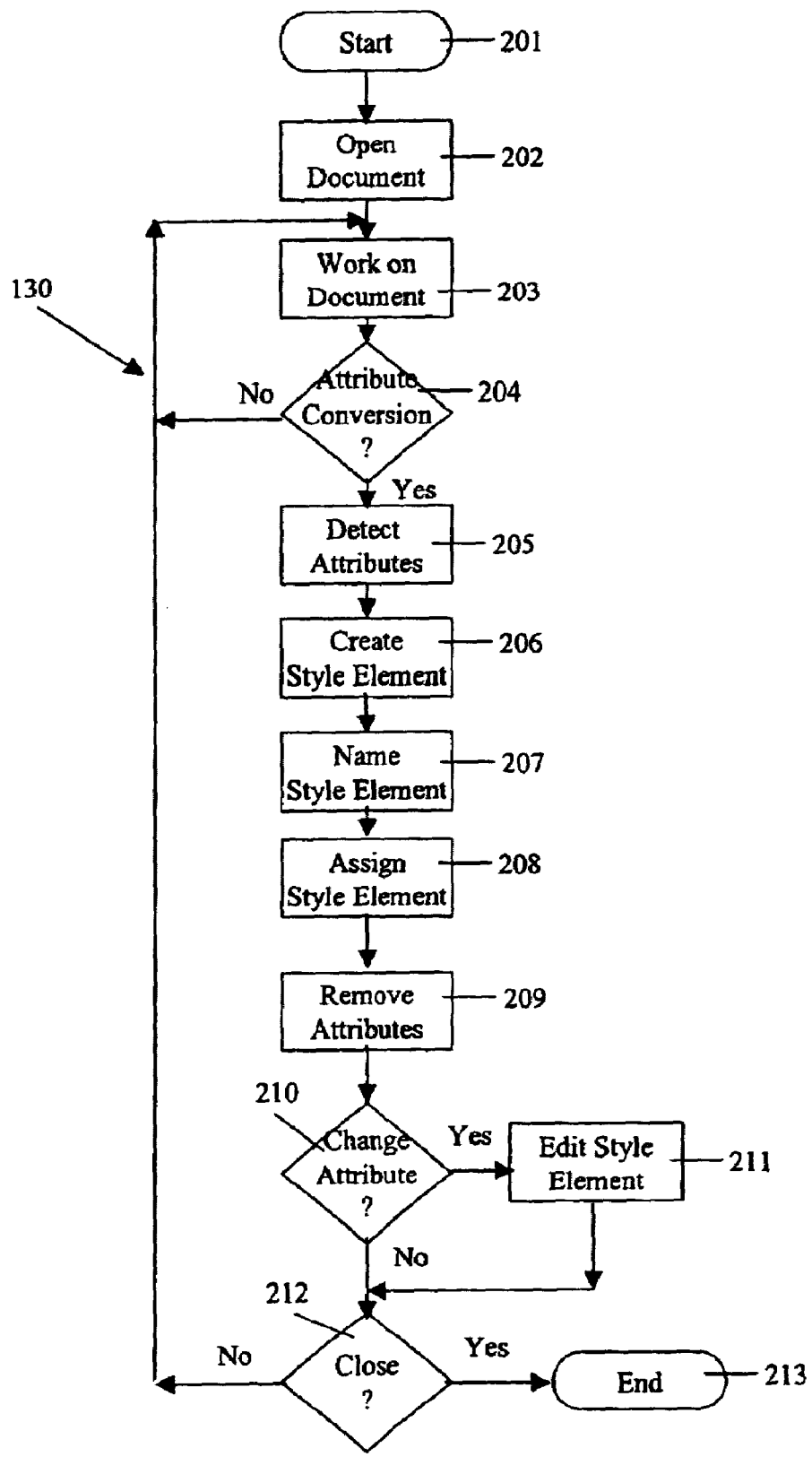
FIG. 2 is a process flow diagram of the method for converting directly-assigned attributes to conversion style elements according to an embodiment of the present invention.

FIG. 2 is a process flow diagram for one embodiment of method 130 of the present invention. In this embodiment, method 130 is included in an application 135 that is in a volatile memory 110, e.g., random access memory, of computer system 100. Initially, the user starts application 135 in start operation 201. After starting application 135, the user opens a computer-readable document 120 using application 135 in open document operation 202. A computer-readable document may be, for example, a text document, a presentation document, an HTML page or a spreadsheet document. The particular type of computer-readable document is not essential to this invention. Here, open document operation 202 can be either creating a new document, or retrieving an existing computer-readable document from a non-volatile memory.

If computer system 100 is a stand-alone system, document 120 is retrieved from non-volatile memory 115 and loaded in volatile memory 110. However, if system 100 is part of a client-server system 150, document 120 could be retrieved from memory 184 of computer system 180 over network 104. In general, the memory containing document 120 must be accessible by system 100.

While in FIG. 1, application 135 is loaded completely into volatile memory 110, this illustrative only. Those of skill in the art will appreciate that depending upon the hardware capabilities of computer system 100, application 135, and the computer operating system, all or only a part of application 135 may be moved into memory 110.

Figure 3A:
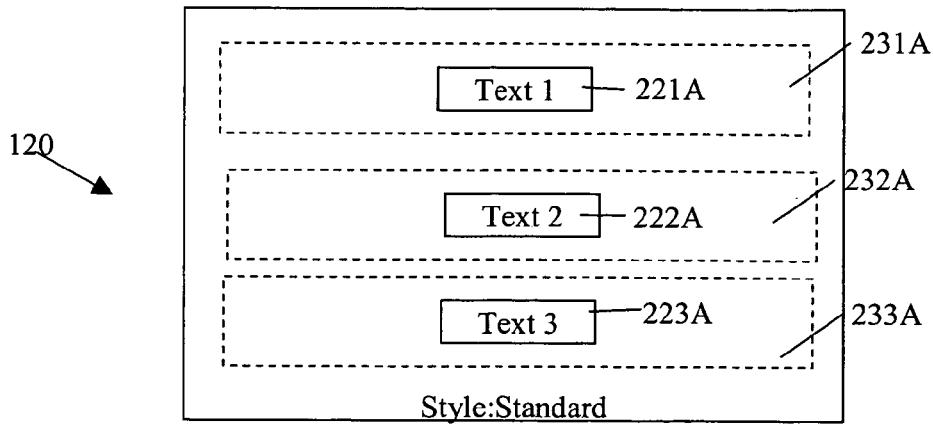
FIG. 3A is a schematic illustration of a document that is opened and data entered in the method for converting directly-assigned attributes to conversion style elements according to an embodiment of the present invention.

Operation 202 transfers to work on document operation 203. FIG. 3A is an example of a computer-readable document 120 in operation 203. The user has either selected style Standard after opening document 120, or configured application 135 so that upon opening document 120, style Standard is assigned to document 120 as a default style.

Figure 3B:
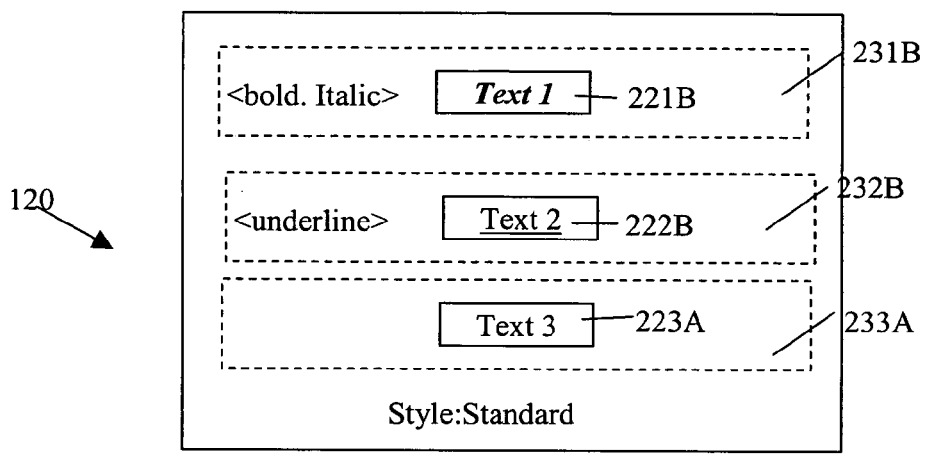
FIG. 3B is a schematic illustration of the document of FIG. 3A after the user has directly assigned attributes to objects in the document in the method for converting directly-assigned attributes to conversion style elements according to an embodiment of the present invention.

In operation 203, the user has entered three text portions 221A, 222A, and 223A. In FIG. 3A, the solid line boxes around text portions 221A, 222A, and 223A are intended to represent the part of document that is seen by the user either on monitor 116 or printer 117, for example. The user selects text portion 221A using an I/O device, e.g., keyboard 119 or mouse 118, and then uses application 135 to apply attributes bold and italic directly to text portion 221A to produce text portion 221B. The attributes applied to the text within box 232B are shown as <bold, italic> in FIG. 3B. This representation is for illustration purposes only, the actual method used to represent the directly applied attributes depends upon application 135 and so is known to one of skill in the art.

Next, the user selects text portion 222A using an I/O device, and then uses application 135 to apply attribute underline directly to produce text portion 222B. The attribute applied to the text within box 232B is shown as <underline> in FIG. 3B. The user does not change text portion 223A. Hence, no directly applied attributes are shown in box 233A in FIG. 3B. While in FIGS. 3A and 3B, text has been used as an example in operation 203, this is illustrative only. The user can directly assign formatting attributes like character styles, underline, paragraph spacings, particulars of mathematical or chemical formulae, or the like to objects in the document.

Attribute conversion check operation 204 waits for a user attribute conversion request. Those of skill in the art will appreciate that check operation 204 does not need to be continually polling for user input. The representation of FIG. 2 is for ease of discussion only. Typically, in a windowing environment, an event handler is called each time a user inputs a request. The event handler analyzes the user request, and calls an appropriate process for handling the user request. In addition, the sequential process flow of FIG. 2 is illustrative only. Those of skill in the art can implement process 130 in a multi-threading environment if desired. Check operation 204, in one embodiment, is a representation of the event handler.

If the user requests conversion of the directly-applied attributes, check operation 204 transfers processing to detect attributes operation 205. Detect attributes operation 205 scans document 120 to detect objects having directly-assigned attributes. Detect attributes operation 205 passes the detected directly-applied attributes to create style element operation 206.

In one embodiment, for every combination of directly-assigned attributes present in document 120, a new conversion style is created in operation 206. In another embodiment, for every unique combination of directly-assigned attributes present in document 120, a new conversion style is created in operation 206. Each new conversion style element defines the format determined by the corresponding combination of directly-assigned attributes. Hence, upon completion of operation 206, formatting information of the whole document is therefore contained in conversion style elements and program defined styles.

Figure 3C:
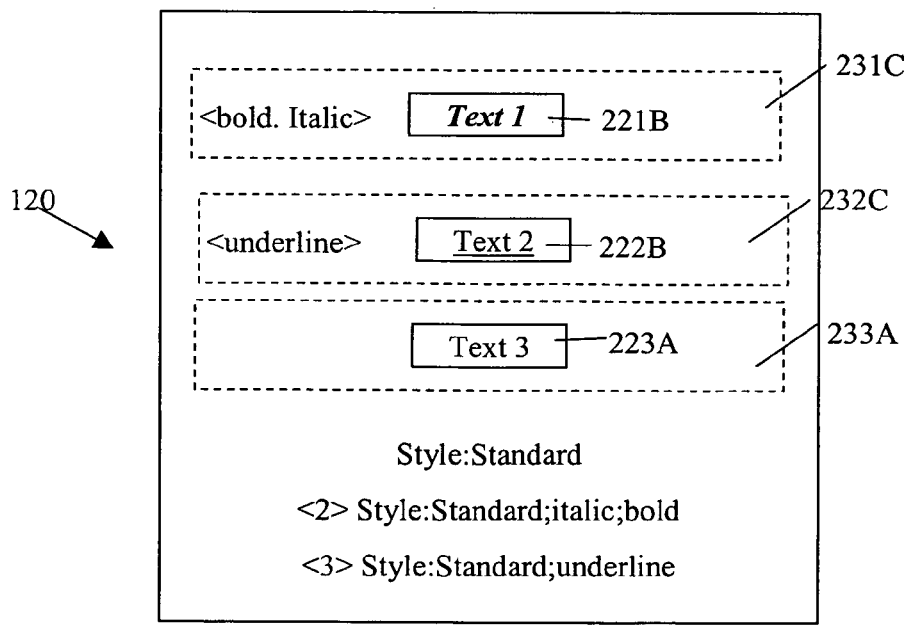
FIG. 3C is a schematic illustration of the document of FIG. 3B after objects having directly-assigned attributes have been detected, and a conversion style element defined for each configuration detected in the method for converting directly-assigned attributes to conversion style elements according to an embodiment of the present invention.

In FIG. 3C, the program defined style is "Style:Standard." The conversion style elements are style element <2> Style:, which is a style element for the standard style with italic and bold, and style element <3> Style:, which is a style element for the standard style with underline. One method for performing operations 205 and 206 is presented in commonly assigned U.S. patent application Ser. No. 09/782,899, entitled "METHOD AND SYSTEM FOR SEPARATING CONTENT AND LAYOUT OF FORMATTED OBJECTS" of Michael Brauer, Matthias Breuer, and Christian Lippka, which is incorporated herein by reference in its entirety. Upon completion of operation 206, processing transfers to name style element operation 207.

In name style element operation 207, each conversion style element created in operation 206 is denominated with a name indicative of the conversion style element. As illustrated is FIG. 3C, conversion style element <2> Style: is named Standard; bold; italic, and conversion style element <3> Style: is named Standard; underline. With these names, the user can easily recognize the attributes defined by these newly created conversion style elements. Upon completion of operation 207, processing transfers to assign style element operation 208.

In assign style element operation 208, each object having directly-assigned attributes that was detected in operation 205 is assigned the conversion style element corresponding to the directly-assigned attributes for the object. This is illustrated in FIG. 3D by conversion style element tag <2>, which is associated with conversion style element named Standard; bold; italic, and by conversion style element tag <3>, which is associated with conversion style element named Standard; underline. In general, objects having identical directly-assigned attributes are preferably assigned the same conversion style element to reduce the total file size of document 120. Here, the conversion style element tags are examples of references to conversion style elements. Operation 208 transfers processing to remove attributes operation 209.

In remove attributes operation 209, the user directly-assigned attributes are removed from each object that was given a conversion style element tag in operation 208. Hence, upon completion of operation 209, document 120 is in the state illustrated in FIG. 3E. Operation 209 transfers to charge attribute check operation 210.

If the user wishes to change a directly-assigned attribute throughout document 120, for example replace the attribute "bold" by "underline," the user generates a request to edit the conversion style elements. The event handler processes the request in check operation 210 and transfers processing to edit style operation 211 if the user requested to edit the conversion style elements, and otherwise check operation 210 transfers to close check operation 212. If the user has requested to close the document, method 130 is terminated and document 120 is saved. Otherwise, processing returns to operation 203.

Again, operations 210 and 212 do not need to be performed exactly after operation 209, or in sequence. The sequence of operations in FIG. 2 is intended to show that the conversion style elements cannot be edited until they are generated by process 130. After the conversion style elements are created, the elements are stored and can be edited at any subsequent time by the user.

In edit style operation 211, the user can edit the conversion style element, and the changes made by the user are applied to each object in document 120 associated with the edited conversion style element. Consequently, the user no longer has to scroll through the document to find each object with the directly-assigned attribute to be changed and manually change the attribute.

In edit style operation 211, the user could change for example, all objects the user directly-assigned the color "red" to another color that could be printed or alternatively displayed. In one embodiment, edit style operation 211 displays a list of all conversion style elements, and the user can simultaneously change one or more directly-assigned attributes in all the conversion style elements in which the one or more attributes appear. For example, if the color "red" appears in six of ten conversion style elements, the user can simultaneously change the color "red" to another color in each of these conversion style elements by selecting the affected conversion style elements and then entering the change. In another embodiment, the user enters the edit to the directly-assigned attribute, and then operation 211 asks the user if the change is desired in each conversion style element affected by the edit. Similarly, a group of attributes like "Greek characters," or "Japanese characters," or any other desired character set can be edited in operation 211. Thus, operation 211 permits the user to change easily the directly-assigned attributes throughout the whole document.

In one embodiment, operations 204 to 209 are carried out while document 120 is open and stored in a random access memory 110 of user device 100. However, method 130 can also provide an automatic attribute conversion before closing document 120.

Since method 130 is executed while document 120 is opened by the user, method 130 can be applied to different types of computer-readable documents independent of their internal organization or storage formats. The conversion of directly-assigned attributes into conversion style elements and a possible reconversion takes place with respect to the data stored in a working memory of a computer.

In another embodiment of the present invention, the conversion style elements are converted back into directly-assigned attributes, sometimes called hard-formatting attributes. For this purpose, a distinction is made between user-defined style elements and conversion style elements created by conversion of object directly-assigned attributes.

The conversion of directly-assigned attributes into conversion style elements greatly facilitates changing particular attributes or groups of attributes. Moreover, the total document size is reduced and content data and formatting data can be separated in the document as illustrated in FIG. 3E. While in the embodiment of FIG. 3E, the formatting data is stored within document 120, this is illustrative only and is not intended to limit the invention to this embodiment. Alternatively, the formatting data could be stored in another file that is accessed when document 120 is opened.

The drawings and the forgoing description gave examples of the present invention. The scope of the present invention, however, is by no means limited by these specific examples.

In addition, those skilled in the art will readily recognize that, in another embodiment of the present invention, method 130 may also be implemented by dedicated electronic circuits, which are configured such that they perform the individual operations explained above in connection with method 130. In yet another embodiment of the invention, a storage medium has thereon installed computer-executable program code, which causes processors, such as processors 101 or 181 in FIG. 1, to perform the operations of method 130 explained above.

In addition, method 130 can be executed on a hardware configuration like a personal computer or workstation as illustrated schematically in FIG. 1 by computer system 100. Method 130, however, may be applied to a client-server configuration 150 that also is illustrated in FIG. 1. In this embodiment, some or all operations of method 130 are carried out on a server computer 180 accessible by client device 100 over a data network 104, or networks, such as the Internet, using a browser application or the like.

Herein, a computer program product comprises a medium configured to store or transport computer-readable code for method 130 or in which computer-readable code for method 130 is stored. As illustrated in FIG. 1, this storage medium may belong to computer system 100 itself. However, the storage medium also may be removed from computer system 100. For example, method 130 may be stored in memory 184 that is physically located in a location different from processor 101. The only requirement is that processor 101 is coupled to the memory containing method 130. This could be accomplished in a client-server system 150, e.g., computer system 100 is the client and server system 180 is the server, or alternatively via a connection to another computer via modems and analog lines, or digital interfaces and a digital carrier line.

For example, memory 184 could be in a World Wide Web portal, while display unit 116 and processor 101 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 100, in one embodiment, can be a portable computer, a workstation, a two-way pager, a cellular telephone, a digital wireless telephone, a personal digital assistant, a server computer, an Internet appliance, or any other device that includes the components shown and that can execute method 130, or at least can provide the input instructions to method 130 that is executed on another system. Similarly, in another embodiment, computer system 100 can be comprised of multiple different computers, wireless devices, cellular telephones, digital telephones, two-way pagers, or personal digital assistants, server computers, or any desired combination of these devices that are interconnected to perform method 130, as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

Consequently, in view of this disclosure, those of skill in the art will recognize that method 130 can be implemented in a wide variety of computer system configurations. In addition, method 130 could be stored as different modules in memories of different devices. For example, method 130 could initially be stored in a server computer 180, and then as necessary, a module of method 130 could be transferred to a client device and executed on the client device. Consequently, part of method 130 would be executed on server processor 181, and another part of method 130 would be executed on processor 101 of computer system 100. In view of this disclosure, those of skill in the art can implement the invention on a wide-variety of physical hardware configurations using an operating system and computer programming language of interest to the user. For example, FIG. 1 shows input devices 119 and 118, but other input devices, such as speech recognition software and/or hardware could be used to input the selections and data for method 130.

In yet another embodiment, method 130 is stored in memory 184 of system 180. Stored method 130 is transferred, over network 104 to memory 115 in computer system 100. In one embodiment, network interface 183 and I/O interface 102 would include analog modems, digital modems, or a network interface card. If modems are used, network 104 includes a communications network, and method 130 is downloaded via the communications network.

Those of skill in the art will also recognize that method 130 may be implemented in a computer program including a comprehensive STAROFFICE office application that is available from Sun Microsystems, Inc. of Palo Alto, Calif. (STAROFFICE is a trademark of Sun Microsystems, Inc.) Such a computer program may be stored on any common data carrier like, for example, a floppy disk or a compact disc (CD), as well as on any common computer system's storage facilities like hard disks. Therefore, one embodiment of the present invention also relates to a data carrier for storing a computer program for carrying out the inventive method. Another embodiment of the present invention also relates to a method for using a computer system for carrying out the presented inventive method. Yet another embodiment of the present invention further relates to a computer system with a storage medium on which a computer program for carrying out the presented inventive method is stored.

Therefore, while the present invention has been explained in connection with various specific embodiments thereof, those skilled in the art will readily recognize that modifications can be made to this embodiment without departing from the spirit and scope of the present invention.

We claim:

1. A method of formatting a computer-readable document comprising a plurality of objects having directly-assigned attributes, the method comprising:

detecting objects, in said computer-readable document, having directly-assigned attributes, wherein each attributes in said directly-assigned attributes was assigned individually to at least one object in said objects by a user while said user had said computer-readable document opened, and further wherein each of said directly assigned attributes specify individual formatting of one of said objects within said computer-readable document;

creating, automatically, a conversion style element for every detected combination of directly-assigned attributes in the computer-readable document; and replacing directly-assigned attributes of each detected object by a reference to one conversion style element wherein said one conversion style element corresponds to said directly-assigned attributes in formatting of said each detected object, wherein an object, in said computer-readable document, having a directly assigned attribute is detected by said method, and a same object, in said computer-readable document, without a directly assigned attribute is not detected by said method.

2. The method of claim 1 wherein said creating a conversion style element further comprises creating a conversion style element for each unique detected combination of directly-assigned attributes.

3. The method of claim 1 further comprising:

opening said computer-readable document in a random access memory of a computer system prior to said detecting operation.

4. The method of claim 1 further comprising:

receiving a request from a user to perform said detecting, creating and replacing operations.

5. The method of claim 1 wherein the computer-readable document comprises a text document.

6. The method of claim 1 further comprising:

naming each conversion style element.

7. A method of formatting a computer-readable document comprising a plurality of objects having directly-assigned attributes, the method comprising:

receiving a request from a user to convert directly-assigned attributes to at least one conversion style element;

detecting objects, in said computer-readable document, having directly-assigned attributes, wherein each attribute in said directly-assigned attributes was assigned individually to at least one object in said objects by a user while said user had said computer-readable document opened, and further wherein each of said directly assigned attributes specify individual formatting of one of said objects within said computer-readable document;

creating, automatically, a conversion style element for every detected combination of directly-assigned attributes in the computer-readable document; and replacing directly-assigned attributes of each detected object by a reference to one conversion style element wherein said one conversion style element corresponds to said directly-assigned attributes in formatting of said each detected object, wherein an object, in said computer-readable document, having a directly assigned attribute is detected by said method, and a same object, in said computer-readable document, without a directly assigned attribute is not detected by said method.

8. A computer system comprising:

a processor; and a memory storing a method for formatting a computer-readable document comprising a plurality of objects having directly-assigned attributes, wherein upon execution of said method on said processor said method comprises:

detecting objects, in said computer-readable document, having directly-assigned attributes, wherein each attribute in said directly-assigned attributes was assigned individually to at least one object in said objects by a user while said user had said computer-readable document opened, and further wherein each of said directly assigned attributes specify individual formatting of one of said objects within said computer-readable document;

creating, automatically, a conversion style element for every detected combination of directly-assigned attributes in the computer-readable document; and replacing directly-assigned attributes of each detected object by a reference to one conversion style element wherein said one conversion style element corresponds to said directly-assigned attributes in formatting of said each detected object, wherein an object, in said computer-readable document, having a directly assigned attribute is detected by said method, and a same object, in said computer-readable document, without a directly assigned attribute is not detected by said method.

9. The computer system of claim 8 wherein said creating a conversion style element further comprises creating a conversion style element for each unique detected combination of directly-assigned attributes.

10. The computer system of claim 8 wherein said method further comprises:

opening said computer-readable document in a random access memory of said memory prior to said detecting operation.

11. The computer system of claim 8 wherein said method further comprises:

receiving a request from a user to perform said detecting, creating and replacing operations.

12. The computer system of claim 8 wherein the computer-readable document comprises a text document.

13. The computer system of claim 8 wherein said method further comprises naming each conversion style element.

14. A computer program product having stored thereon a method of formatting a computer-readable document comprising a plurality of objects having directly-assigned attributes, the method comprising:

detecting objects, in said computer-readable document, having directly-assigned attributes, wherein each attribute in said directly-assigned attributes was assigned individually to at least one object in said objects by a user while said user had said computer-readable document opened, and further wherein each of said directly assigned attributes specify individual formatting of one of said objects within said computer-readable document;

creating, automatically, a conversion style element for every detected combination of directly-assigned attributes in the computer-readable document; and replacing directly-assigned attributes of each detected object by a reference to one conversion style element wherein said one conversion style element corresponds to said directly-assigned attributes in formatting of said each detected object, wherein an object, in said computer-readable document, having a directly assigned attribute is detected by said method, and a same object, in said computer-readable document, without a directly assigned attribute is not detected by said method.

15. The computer program product of claim 14 wherein said creating a conversion style element further comprises creating a conversion style element for each unique detected combination of directly-assigned attributes.

16. The computer program product of claim 14 wherein said method further comprises:

receiving a request from a user to perform said detecting, creating and replacing operations.

17. The computer program product of claim 14 wherein said method further comprises:

naming each conversion style element.

* * * * *